Dec. 29, 1942.    J. B. SWAN    2,306,916
LOCOMOTIVE DRIVING BOX
Filed May 9, 1941
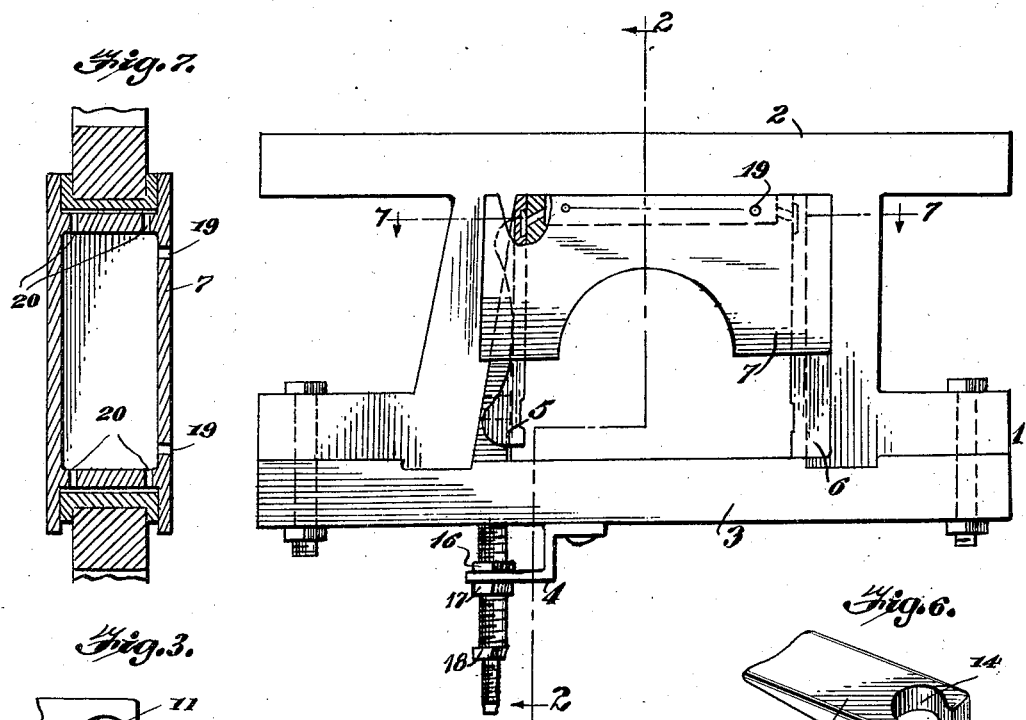
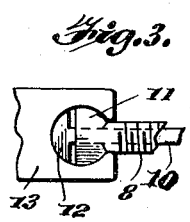
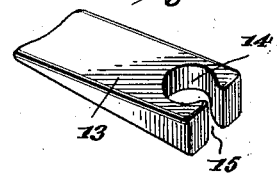
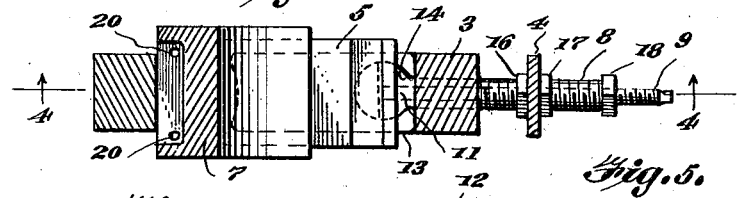
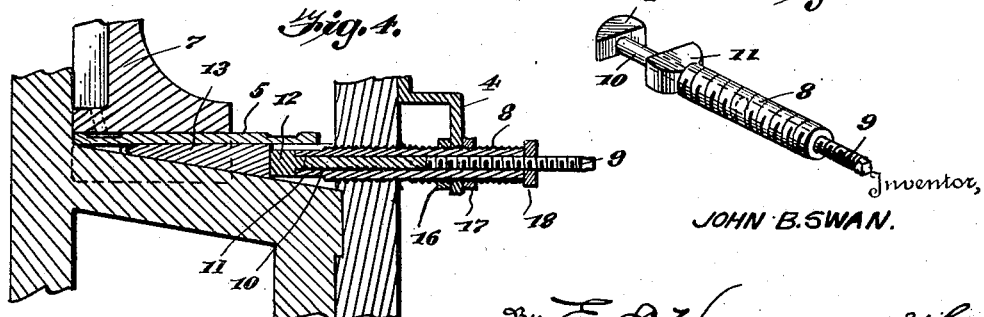
Inventor,
JOHN B. SWAN.

Patented Dec. 29, 1942

2,306,916

UNITED STATES PATENT OFFICE 2,306,916

LOCOMOTIVE DRIVING BOX

John B. Swan, Gladstone, Mich., assignor of one-half to Glenn W. Jackson, Gladstone, Mich., and Richard W. Nebel, Munising, Mich.

Application May 9, 1941, Serial No. 392,816

3 Claims. (Cl. 105—81)

This invention relates to a locomotive driving box, and more particularly to a wedge bolt device.

This device is adapted to be used in connection with all types of locomotive wedges, including the original wedge which is generally in use at this time upon the older locomotives, and any improvements that have been made by separate wedges.

The difficulty experienced with wedges has been that the continuous up and down motion causes wear of the circular slot or aperture in the face of the wedge, causing this slot to become enlarged vertically and this results in a hammering upon the wedge bolt, which eventually breaks the wedge bolt, releasing the adjustment.

Therefore, an object of this invention is the construction of a novel and efficient wedge bolt device which can be quickly adjusted to take up the wear, whereby the life of the device will be greatly increased, as well as a very efficient assembly of the units will be accomplished.

Another object of the invention is the construction of simple and efficient, as well as novel means, for adjusting the wedge as wear occurs to eliminate hammering and breaking of the device.

With the foregoing and other objects in view the invention comprises certain novel constructions, combinations, and arrangements of parts as will be hereinafter fully described, illustrated in the accompanying drawing, and more particularly pointed out in the appended calims.

In the drawing:

Figure 1 is a view in side elevation of a locomotive frame, showing my improvements applied thereto.

Figure 2 is a sectional view taken on line 2—2, Figure 1, and looking in the direction of the arrows.

Figure 3 is a fragmentary plan view of the wedge and the wedge bolt device.

Figure 4 is a sectional view taken on line 4—4, Figure 2, and looking in the direction of the arrows.

Figure 5 is a perspective view of the wedge bolt device.

Figure 6 is a perspective view of the wedge.

Figure 7 is a sectional view taken on line 7—7, Figure 1, and looking in the direction of the arrows.

Referring to the drawing by numerals, 1 designates a frame, which comprises a support for the wedge and the wedge bolt device, hereinafter specifically described. The frame 1 comprises a primary section 2 and an auxiliary section 3. Within the frame 1 is a shoe 5 and a shoe 6. A box 7 is within the frame in engagement with said shoes. An angle bracket 4 is fastened to the outer face of the auxiliary section 3, Fig. 1.

The wedge bolt device comprises a hollow primary externally and internally threaded bolt 8 into which is threaded an auxiliary bolt 9. Bolt 8 is placed in position on section 3, before sections 2 and 3 are fastened together. A plunger 10 is slidably mounted in the semi-cylindrical head 11 and the inner end of primary bolt 8. A semi-cylindrical head 12 is integral with the outer end of plunger 10. Head 11 is integral with the inner end of said bolt 8 and said head 11 has no adjustment after the parts are assembled. Wedge 13 is provided with an aperture 14 near its outer end, and with a slot 15 opening upon said aperture 14. The heads 11 and 12 are normally in aperture 14 with the primary bolt 8 extending through slot 15. The primary bolt 8 also extends through the angle bracket 4, when the wedge bolt device is in position upon the box 1. The wedge 13 is in engagement with the under face of shoe 5, and by maintaining a tight fit of the wedge 13 against shoe 5 the bearing 7 and shoe 6 are also kept in a tight and efficient position upon the frame 1. A lock nut 16 is on the threaded external surface of the primary bolt 8, and normally presses against the inner face of bracket 4. A lock nut 17 is also on the primary bolt 8, pressing against the outer face of angle bracket 4. A third lock nut 18 is on the externally threaded surface of the auxiliary bolt 9; this nut 18 bearing against the outer end of the primary bolt 8, when the device is locked or normally positioned.

As wear occurs on parts 14 and 15 of the wedge 13, the operator can loosen the lock nut 18, screw inwardly upon the auxiliary bolt 9 which will result in the bolt pushing at its inner end against the inner end of the sliding plunger 10, whereupon head 12 is forced outwardly, thereby tightening the head against the wedge 13, forcing a very tight action on the part of the cooperating units.

It is to be understood that when wear occurs in the aperture 14 and slot 15, this wear is vertical, and by my invention I take up the wear, so to speak, by the novel heads 11 and 12 and their actuating elements. By my invention all of the play is taken up, caused by the wear of the up and down motion of the wedge bolt. In other words, when the engineer sets up this bolt device for adjusting the wedge to accommodate the wear on the surface, at the same time he can set up the top of the wedge bolt head, so as to take up any wear that has occurred within the wedge bolt head, so as to take up also any wear that has occurred within the wedge bolt slot or aperture.

Oiling apertures 19 are formed in the side of the hollow axle box 7 and apertures 20 are formed in the top and bottom portions of said axle box (Fig. 7). This enables the operator to oil the surface of the shoes.

It is to be noted that an accurate adjustment of the wedge 13 and the cooperating wedge bolt device can be obtained upon the frame 1 because the primary bolt is easily placed in the position shown in Figure 1, with the auxiliary bolt and the head-carrying plunger, supported by the primary bolt, whereupon the loosening of the lock nuts can be quickly accomplished, the bolts adjusted to a nicety and then the lock nuts tightened for retaining the entire structure in its accurate assembled position.

While I have described the preferred embodiment of my invention and illustrated the same in the accompanying drawing, certain changes or alterations may appear to one skilled in the art to which this invention relates during the extensive manufacture of the same, and, I therefore, reserve the right to make such changes or alterations as shall fairly fall within the scope of the appended claims.

What I claim is:

1. In a locomotive driving box having a wedge for receiving two heads at an end of a wedge bolt device, and said wedge having an aperture in which said heads are seated; said wedge bolt device being provided with means for urging said heads apart within said aperture, whereby said heads press upon opposite portions of said wedge within said aperture.

2. In a locomotive driving box having a wedge for receiving two heads at an end of a wedge bolt device, and said wedge having an aperture in which said heads are seated; said wedge bolt device comprising a bolt provided with one of said heads, a slidable plunger extending into said bolt and being provided with one of said heads, and manually operated means carried by said bolt and engaging said slidable plunger for urging said heads apart within the aperture of said wedge.

3. In a locomotive driving box having a wedge for receiving two heads at an end of a wedge bolt device, and said wedge having an aperture in which said heads are seated; said wedge bolt device comprising an internally and an externally threaded primary bolt having one of said heads, an auxiliary bolt threaded into said primary bolt, a plunger provided with one of said heads, said plunger extending into said primary bolt and having its inner end normally against said auxiliary bolt, whereby when said auxiliary bolt is rotated in one direction said heads will be urged apart within said aperture.

JOHN B. SWAN.